United States Patent
Nakadai et al.

(10) Patent No.: US 10,127,922 B2
(45) Date of Patent: Nov. 13, 2018

(54) SOUND SOURCE IDENTIFICATION APPARATUS AND SOUND SOURCE IDENTIFICATION METHOD

(71) Applicant: HONDA MOTOR CO., LTD., Tokyo (JP)

(72) Inventors: Kazuhiro Nakadai, Wako (JP); Satoshi Uemura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/227,286

(22) Filed: Aug. 3, 2016

(65) Prior Publication Data

US 2017/0061981 A1    Mar. 2, 2017

(30) Foreign Application Priority Data

Aug. 27, 2015 (JP) ................................. 2015-168108

(51) Int. Cl.
    *G10L 21/00*     (2013.01)
    *G10L 21/028*     (2013.01)
    (Continued)

(52) U.S. Cl.
    CPC .......... *G10L 21/028* (2013.01); *G01S 3/8006* (2013.01); *G10L 25/84* (2013.01); *G10L 2025/786* (2013.01)

(58) Field of Classification Search
CPC ....... G10L 21/028; G10L 25/84; G10L 21/02; G10L 2021/02166; G10L 21/0272; G10L 21/0308; G10L 21/0202; G10L 2025/786; G10L 2025/783; G10L 25/81; G10L 25/48; G01S 3/8006; G01S 3/8003; G01S 3/801; G01S 3/802; G01S 3/8022; G01S 3/8025; G01S 3/8027; G01S 3/803; G01S 3/8032; G01S 3/8034; G01S 3/8036; G01S 3/8038; G01S 3/805; G01S 3/8055; G01S 3/807;
(Continued)

(56) References Cited

U.S. PATENT DOCUMENTS 8,175,297 B1 * 5/2012 Ho ........................... H04R 1/26
    381/111
2002/0010583 A1 * 1/2002 Iwahashi ................. G10L 15/02
    704/255
(Continued)

FOREIGN PATENT DOCUMENTS

JP      2008-085472      4/2008

*Primary Examiner* — Vincent Rudolph
*Assistant Examiner* — Stephen Brinich
(74) *Attorney, Agent, or Firm* — Rankin, Hill & Clark LLP

(57) ABSTRACT

A sound source identification apparatus includes a sound collection unit including a plurality of microphones, a sound source localization unit configured to localize a sound source on the basis of an acoustic signal collected by the sound collection unit, a sound source separation unit configured to perform separation of the sound source on the basis of the signal localized by the sound source localization unit, and a sound source identification unit configured to perform identification of a type of sound source on the basis of a result of the separation in the sound source separation unit, and a signal input to the sound source identification unit is a signal having a magnitude equal to or greater than a first threshold value which is a predetermined value.

6 Claims, 11 Drawing Sheets

(51) Int. Cl.
  *G10L 25/84* (2013.01)
  *G01S 3/80* (2006.01)
  *G10L 25/78* (2013.01)

(58) Field of Classification Search
  CPC ...... G01S 3/808; G01S 3/8083; G01S 3/8086; G01S 3/809
  USPC ........ 704/269–270, 273, 231–235, 275, 260; 381/92, 56, 17
  See application file for complete search history.

(56) References Cited

U.S. PATENT DOCUMENTS

| | | | |
|---|---|---|---|
| 2005/0010406 A1* | 1/2005 | Koshiba | G10L 15/20 704/233 |
| 2007/0037536 A1* | 2/2007 | Battaglini | H04M 1/247 455/212 |
| 2009/0018828 A1* | 1/2009 | Nakadai | G10L 15/20 704/234 |
| 2014/0079259 A1* | 3/2014 | Kwon | H04R 25/405 381/313 |
| 2014/0358264 A1* | 12/2014 | Long | G10H 1/0058 700/94 |

* cited by examiner

| SOUND | ADDITION AVERAGE VALUE SPave(d) OF SPATIAL SPECTRUM MusicSP(k,d) | CONSTANT $\alpha$ | IDENTIFICATION THRESHOLD VALUE $Th_{SSI}$ | RECOGNITION RATE |
|---|---|---|---|---|
| SOUND 1 | ADDITION AVERAGE VALUE 1 | $\alpha_1$ | $Th_{SSI1}$ | |
| SOUND 2 | ADDITION AVERAGE VALUE 2 | $\alpha_2$ | $Th_{SSI2}$ | |
| ... | ... | ... | ... | |

| | TYPE | CONTENT |
|---|---|---|
| VOICE | 2 | VOICE OF WOMAN PROVIDING GUIDANCE AND VOICE OF MAN SHOUTING |
| NON-VOICE | 8 | AMBULANCE, APPLAUSE, ALARM CLOCK, CYMBALS, HORN, CROW CAWING, CELL PHONE, AND WHISTLE |

| PARAMETER | VALUE |
|---|---|
| NUMBER OF SOUND SOURCES | 1 |
| THRESHOLD VALUE | 23.04 |
| TIME WIDTH | 500 (ms) |

| IDENTIFIER | | |
|---|---|---|
| CNN | GMM (MIXTURE NUMBER 10) | GMM (MIXTURE NUMBER 20) |
| 98.02 | 78.43 | 81.02 |

SOUND SOURCE IDENTIFICATION APPARATUS AND SOUND SOURCE IDENTIFICATION METHOD

CROSS-REFERENCE TO RELATED APPLICATION

Priority is claimed on Japanese Patent Application No. 2015-168108, filed Aug. 27, 2015, the content of which is incorporated herein by reference.

BACKGROUND OF THE INVENTION

Field of the Invention

The present invention relates to a sound source identification apparatus and a sound source identification method.

Description of Related Art

In acoustic signal processing, schemes such as sound source localization for identifying a sound source direction, sound source separation for separating a desired sound from a plurality of sounds, and sound source recognition (sound source identification) for specifying a type of sound source are used.

Japanese Unexamined Patent Publication No. 2008-85472 (hereinafter, Patent Document 1) discloses a sound source identification apparatus including a sound source localization unit and a sound source identification unit, in which each of the sound source localization unit and the sound source identification unit includes a neural network including a plurality of pulse neuron models. A pulse neuron model is a neuron model using a pulse sequence as an input and output signal. In the technology described in Patent Document 1, improving accuracy of sound source identification by performing learning on the pulse neuron model is proposed.

Further, in recent years, in disaster areas or the like, it is preferable to detect the voice of a person to be rescued using a quadcopter on which a microphone is mounted. In such an environment, there is a large amount of noise interfering with a desired sound source, such as wind noise generated by the quadcopter, wind noise generated by the microphone, or sounds generated by an environment. Thus, it is preferable to detect a specific sound source even in a noisy environment.

SUMMARY OF THE INVENTION

However, in the technology described in Patent Document 1, accuracy of sound source identification is affected by the quality of a signal input to the pulse neuron model. Therefore, there is a problem in that a desired sound source cannot be detected with high accuracy in a noisy environment.

Aspects according to the present invention have been made in view of the above circumstances, and an object thereof is to provide a sound source identification apparatus and a sound source identification method capable of improving detection accuracy of a specific sound source even in a noisy environment.

To achieve the above object, the present invention adopts the following aspects.

(1) A sound source identification apparatus according to one aspect of the present invention includes: a sound collection unit including a plurality of microphones; a sound source localization unit configured to localize a sound source on the basis of an acoustic signal collected by the sound collection unit; a sound source separation unit configured to perform separation of the sound source on the basis of the signal localized by the sound source localization unit; and a sound source identification unit configured to perform identification of a type of sound source on the basis of a result of the separation in the sound source separation unit, wherein a signal input to the sound source identification unit is a signal having a magnitude equal to or greater than a first threshold value which is a predetermined value.

(2) In the aspect (1), the sound source identification unit may perform identification of a type of sound source on a signal in which a magnitude of the sound source is equal to or greater than the first threshold value when the sound source is detected using a second threshold value different from the first threshold value.

(3) In the aspect (2), the signal in which a magnitude of the sound source is equal to or greater than the first threshold value may be a signal of a sound source localized by the sound source localization unit.

(4) In the aspect (2), the signal in which a magnitude of the sound source is equal to or greater than the first threshold value may be a signal of a sound source separated by the sound source separation unit.

(5) In the aspect (1), the sound source identification unit may perform estimation of a spectrum of noise included in the collected acoustic signal when the sound source is not detected, and determine the first threshold value on the basis of an estimated value of the estimated spectrum of the noise.

(6) In the aspect (5), the sound source identification unit may calculate the first threshold value using addition average of the estimated value of the spectrum of the noise.

(7) A sound source identification method according to an aspect of the present invention includes: a sound collection process in which a sound collection unit includes a plurality of microphones; a sound source localization process in which a sound source localization unit localizes a sound source on the basis of an acoustic signal collected in the sound collection process; a sound source separation process in which a sound source separation unit performs separation of the sound source on the basis of the signal localized in the sound source localization process; and a sound source identification process in which a sound source identification unit performs identification of a type of sound source on the basis of a signal having a magnitude equal to or greater than a first threshold value which is a predetermined value among signals separated through the sound source separation process.

According to the above-described aspects (1) and (7), it is possible to improve accuracy of the sound source identification since the identification of the sound source is performed using only the signal with a high SN ratio.

Further, in the case of the above-described aspects (2), (3), and (4), it is possible to prevent the sound source identification from being performed on noise since the sound source identification is performed only when the sound source is detected, that is, on only the signal with a high SN ratio.

Further, in the case of the above-described aspect (5), it is possible to appropriately obtain the first threshold value used for sound source identification by estimating a spectrum of the noise.

Further, in the case of the above-described aspect (6), it is possible to reduce an influence of sudden noise or the like by using the averaged noise spectrum.

DETAILED DESCRIPTION OF THE INVENTION

Hereinafter, embodiments of the present invention will be described with reference to the drawings. In the following description, an example in which a sound source identification apparatus is mounted on a quadcopter will be described.

[First Embodiment]
<Configuration of Sound Source Identification Apparatus 1>

Figure 1:
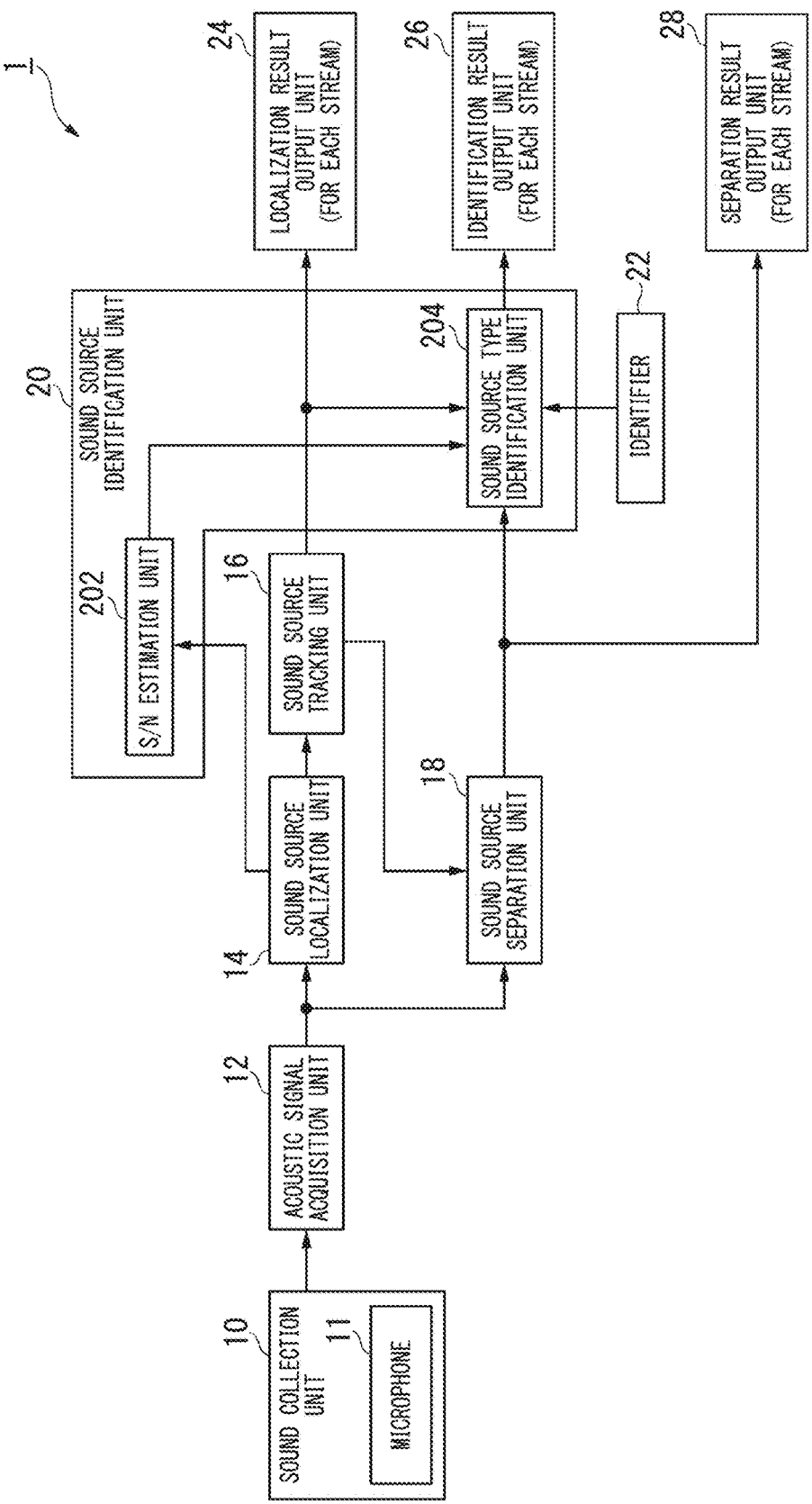
FIG. 1 is a block diagram illustrating a configuration of a sound source identification apparatus according to a first embodiment.

FIG. 1 is a block diagram illustrating a configuration of a sound source identification apparatus 1 according to this embodiment.

As illustrated in FIG. 1, the sound source identification apparatus 1 includes a sound collection unit 10, an acoustic signal acquisition unit 12, a sound source localization unit 14, a sound source tracking unit 16, a sound source separation unit 18, a sound source identification unit 20, an identifier 22, a localization result output unit 24, an identification result output unit 26, and a separation result output unit 28. Further, the sound source identification unit 20 includes an S/N estimation unit 202 and a sound source type identification unit 204.

Figure 2:
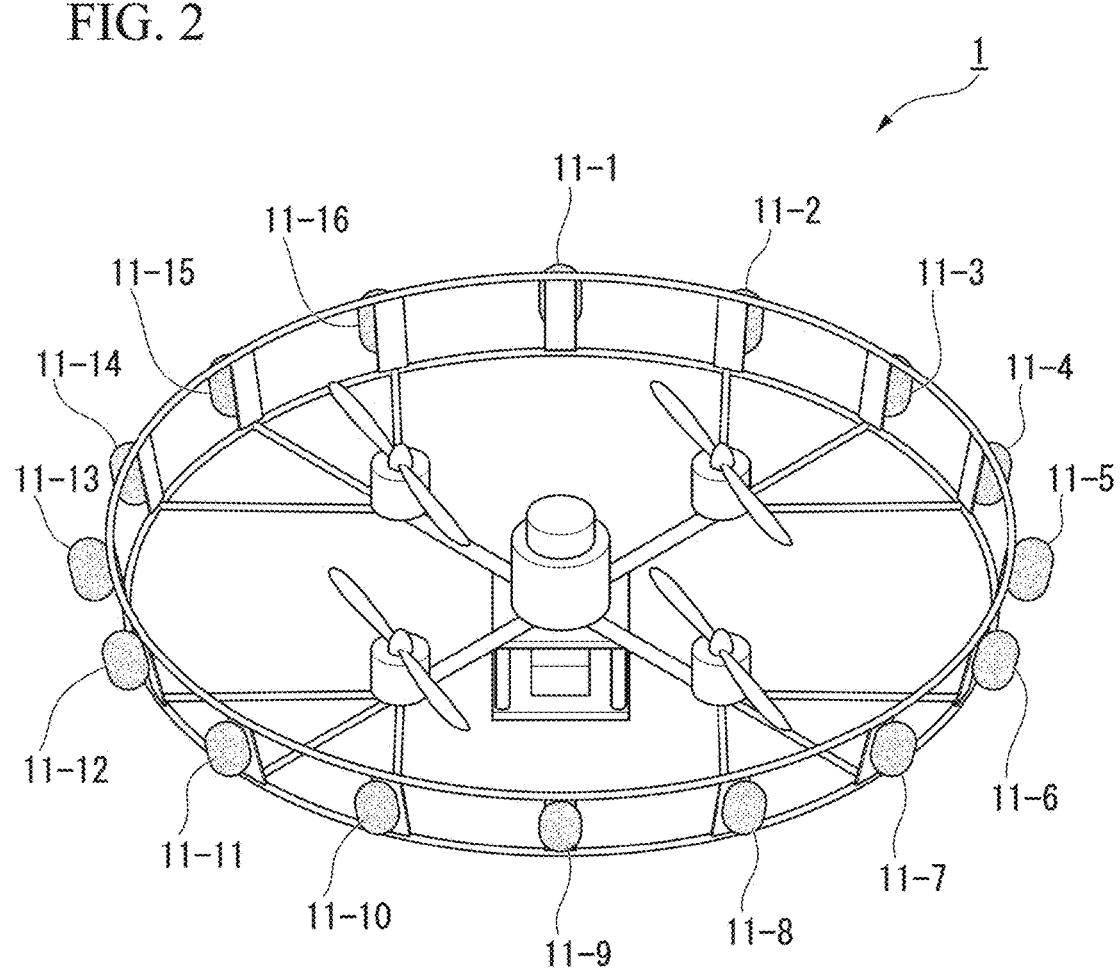
FIG. 2 is a diagram illustrating an example in which a sound source identification apparatus is mounted on a quadcopter according to the first embodiment.

The sound collection unit 10 is a microphone array including M (M is an integer equal to or greater than 2) microphones 11. When no particular one of the plurality of microphones 11-1 to 11-M is specified, the microphones are referred to as a microphone 11. FIG. 2 is a diagram illustrating an example in which the sound source identification apparatus 1 is mounted on a quadcopter according to this embodiment. In the example illustrated in FIG. 2, the sound collection unit 10 of the sound source identification apparatus 1 includes sixteen microphones 11-1 to 11-16. Further, the microphones 11-1 to 11-16 are regularly and circumferentially arranged. The sound collection unit 10 converts a collected audio signal into an electric signal, and outputs the converted audio signal to the acoustic signal acquisition unit 12. The sound collection unit 10 may wirelessly transmit a recorded audio signal of M channels to the acoustic signal acquisition unit 12 or may transmit the recorded audio signal of M channels by wire. The audio signal may be synchronized between channels at the time of transmission.

The acoustic signal acquisition unit 12 acquires the acoustic signal of M channels recorded by the M microphones 11 of the sound collection unit 10. The acoustic signal acquisition unit 12 performs, for example, a discrete Fourier transform (DFT) on the acquired audio signal of M channels for an audio signal $x_i(k)$ (k is an integer representing a sample time, and i is an integer for which $1 \leq i \leq N$) for each channel i to generate a frequency domain signal $x_i(\omega)$ ($\omega$ is a frequency), and outputs the generated frequency domain signal $x_i(\omega)$ to the sound source localization unit 14 and the sound source separation unit 18.

The sound source localization unit 14 calculates a spatial spectrum for the frequency domain signal of M channels output by the acoustic signal acquisition unit 12. The sound source localization unit 14 performs estimation of a direction angle of the sound source (also referred to as "performs sound source localization"), for example, discretely in units of one to several tens of frames on the basis of the calculated spatial spectrum. The sound source localization unit 14 estimates a direction angle using, for example, a multiple signal classification (MUSIC) method. The sound source localization unit 14 may perform sound source localization using, for example, a beam forming method. In the following description, an example in which the sound source localization unit 14 estimates the direction angle using the MUSIC method will be described. The sound source localization unit 14 performs a determination as to whether or not there is a sound source according to whether or not a sum value $P'_{t,d}$ obtained by summing MUSIC spectrums for each frequency bin for each direction d is equal to or greater than a second threshold value $P_{thres}$, as described below. The sound source localization unit 14 outputs estimated direction angle information of the sound source to the sound source tracking unit 16. Further, the sound source localization unit 14 outputs the calculated spatial spectrum to the S/N estimation unit 202 for each direction in which the sound source localization is performed and for each frame in which no sound source is detected.

The sound source tracking unit 16 tracks data after the discrete sound source localization in the sound source localization unit 14, in a time direction using a well-known scheme (see, for example, reference 1). The sound source tracking unit 16 generates sound source localization information in which discrete data is continuous in the time direction using, for example, a Kalman filter or a particle filter, on the basis of a result of tracking, and outputs the generated sound source localization information to the sound source separation unit 18, the sound source identification unit 20, and the localization result output unit 24.

<Reference 1>

"Bayes Extension of Sound Source Localization Using a MUSIC Method", Takuma Otsuka, Kazuhiro Nakadai, Tetsuya Ogata, Hiroshi Okuno, The Robotics Society of Japan, The 29th Annual Conference of The Robotics Society of Japan, 2011.

The frequency domain signal of M channels output by the acoustic signal acquisition unit 12, and the sound source localization information output by the sound source tracking unit 16 are input to the sound source separation unit 18. The sound source separation unit 18 separates the acoustic signal for each sound source continuously in units of frames or samples with respect to the frequency domain signal of M channels using the sound source localization information input from the sound source tracking unit 16. The sound source separation unit 18 separates the sound source using, for example, a geometrically constrained high-order decorrelation based source separation with adaptive step-size control (GHDSS-AS) method which is a hybrid of blind separation and beam forming. The sound source separation unit 18 outputs the separated frequency domain signal for each sound source to the sound source type identification unit 204 of the sound source identification unit 20 and the separation result output unit 28.

In the identifier 22, a model for identifying a type of sound source built by machine learning is stored. The identification model built by machine learning is, for example, at least one scheme among a Gaussian mixture model (GMM), a support vector machine (SVM), a deep (denoising) autoencoder (DAE/DDAE), and a convolutional neural network (CNN). The identifier 22 may be included in a server apparatus or the like. In this case, a connection may be made over a network.

The spatial spectrum output by the sound source localization unit 14 is input to the S/N estimation unit 202 for each sound source localization direction and for each frame in which no sound source is detected. The S/N estimation unit 202 calculates an addition average value of a noise spectrum for each direction in which the sound source is localized, using the input spatial spectrum. The S/N estimation unit 202 calculates an identification threshold value (a first threshold value) which is a threshold value used for sound source identification, for each direction in which the sound source is localized, on the basis of the calculated addition average value of the noise spectrum. When the power of the spatial spectrum is equal to or higher than the identification threshold value, the S/N estimation unit 202 determines that the sound source identification is to be performed since the signal is a signal with a high SN ratio, for each sound-source-localized direction and for each frame. Further, when the power of the spatial spectrum is lower than the identification threshold value, the S/N estimation unit 202 determines that the sound source identification is not to be performed since the signal is a signal with a low SN ratio, for each sound-source-localized direction and for each frame. The S/N estimation unit 202 outputs information indicating whether or not the sound source identification is to be performed, to the sound source type identification unit 204 after the determination, for each sound-source-localized direction and for each frame.

In a frame in which the information indicating that the sound source identification is to be performed is input from the S/N estimation unit 202, the sound source type identification unit 204 identifies each type of sound source output by the sound source separation unit 18 using the identifier 22 on the basis of the sound source localization information output by the sound source tracking unit 16. Further, the sound source type identification unit 204 performs, for example, sound source identification using a majority of a result of the identification on the type of sound source for each stream. The sound source type identification unit 204 does not perform the identification of a type of sound source in a frame in which the information indicating that the sound source identification is not to be performed is input. Accordingly, in this embodiment, when the sound source identification is performed on each separated sound source, the sound source identification is performed using only the signal with a high SN ratio among all spectra detected to be sound sources. After performing the sound source identification, the sound source type identification unit 204 outputs sound source identification information to the identification result output unit 26.

The localization result output unit 24 outputs the sound source localization result based on the sound source localization information output by the sound source tracking unit 16, at a timing of each stream. Information indicating a direction of the detected sound source is included in the sound source localization result.

The identification result output unit 26 outputs the sound source identification result based on the sound source identification information output by the sound source type identification unit 204, for each sound source and each stream. Information indicating the type of sound source is included in the sound source identification result, for each sound source.

The separation result output unit 28 converts the frequency domain signal for each separated sound source output by the sound source separation unit 18 into a time domain signal, and outputs the converted signal at a timing of each stream.

Here, a reason for the performance of the majority in the sound source identification using only the signal with a high SN ratio will be described.

Figure 3:
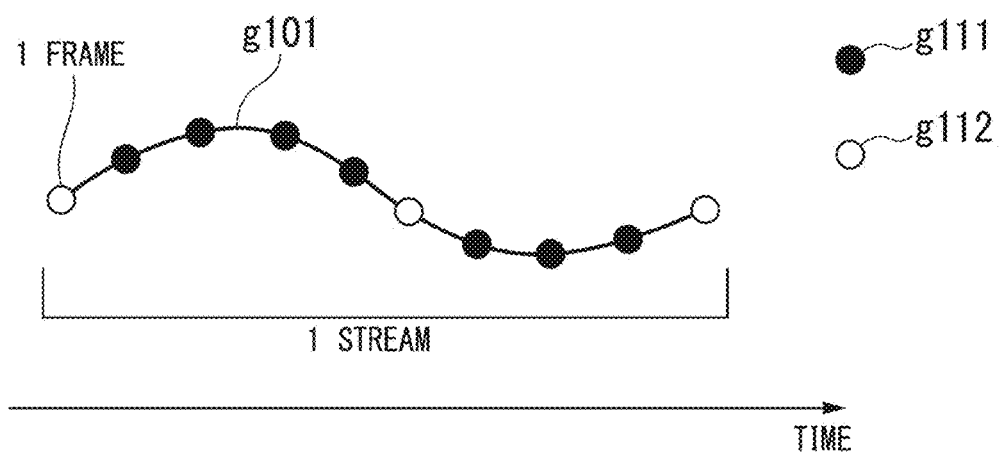
FIG. 3 is a diagram illustrating an example of a signal of one stream which is a sound source identification target.

FIG. 3 is a diagram illustrating an example of a signal of one stream which is a sound source identification target. In FIG. 3, a horizontal axis indicates a time.

In typical sound source identification, sound source identification is performed, for example, on each frame. In the sound source identification, for example, majority is performed in one stream on the result of the identification for each frame to identify a final type of sound source.

As in the example illustrated in FIG. 3, there is a case in which a signal with a high SN ratio (G112) and a signal with a low SN ratio (g111) are included in one stream of a collected acoustic signal g101. If the identification is performed using the signal with the low SN ratio, the type of sound source may be erroneously identified. Therefore, if an identification process is performed on a stream in which the number of signals with a low SN ratio is larger than the number of signals with a high SN ratio, a large number of erroneous identification results may be included in the identification result. If the majority is performed in the entire stream including such erroneous identification results, the sound source identification result is affected.

Therefore, in this embodiment, the sound source identification is performed by performing the majority on a result of the identification of the signal with a high SN ratio, that is, an acoustic signal in which the spatial spectrum is equal to or greater than the first threshold value (identification threshold value $Th_{SSI}(d)$). Accordingly, in this embodiment, since the identification result for the signal with a low SN ratio is not included in the identification result, it is possible to improve accuracy of the sound source identification.

<Sound Source Localization Process>

Next, an overview of a sound source localization process using a MUSIC method (see, for example, Reference 1) which is performed by the sound source localization unit 14 will be described.

$x_{\tau,\omega}$ indicates a complex amplitude vector in a time frame $\tau$ and a frequency bin $\omega$ of the acoustic signal of M channels. The sound source localization unit 14 calculates an autocorrelation matrix $R_{t,\omega}$ of the input signal, as shown in Equation (1) below, with respect to each frequency bin $\omega$ and a time t at intervals of $\Delta T$ [sec].

[Equation 1]

$$R_{t,\omega} = \frac{1}{\tau'(t) - \tau'(t - \Delta T)} \sum_{\tau = \tau'(t-\Delta T)}^{\tau'(t)} x_{\tau,\omega} x_{\tau,\omega}^H \qquad (1)$$

In Equation (1), H is a Hermitian transpose, and $\tau'(t)$ indicates a time frame corresponding to a time t. M elements of input vector $x_{\tau,\omega}$ correspond to each channel.

Next, the sound source localization unit 14 eigenvalue-decomposes the autocorrelation matrix $R_{t,\omega}$ as shown in Equation (2).

[Equation 2]

$$R_{t,\omega} = E_{t,\omega}^H Q_{t,\omega} E_{t,\omega} \qquad (2)$$

In Equation (2), $E_{t,\omega}$ indicates an eigenvector, and $Q_{t,\omega}$ indicates a diagonal matrix including eigenvalues. With $E_{t,\omega} = [e^1_{t,\omega}, \ldots, e^M_{t,\omega}]$ and M eigenvalue vectors of $R_{t,\omega}$, $Q_{t,\omega} = \mathrm{diag}(q^1_{t,\omega} \ldots q^M_{t,\omega})$. Further, the eigenvalues $q^m_{t,\omega}$ are arranged in descending order. diag[ . . . ] indicates a sum of diagonal elements of the matrix . . . .

Then, the sound source localization unit 14 calculates the spatial spectrum (MUSIC spectrum) for each predetermined direction using Equation (3) below. The predetermined direction is, for example, 5 degrees.

[Equation 3]

$$P_{t,d,\omega} = \frac{\|a_{d,\omega}^H a_{d,\omega}\|}{\sum_{m=N_{max}+1}^{M} \|a_{d,\omega}^H e^m_{t,\omega}\|} \qquad (3)$$

In Equation (3), $a_{d,\omega}$ is an M-dimensional transfer function vector corresponding to the direction d and the frequency bin $\omega$.

Next, the sound source localization unit 14 sums the MUSIC spectrum for each direction d and each frequency bin to obtain a sum value, as in Equation (4) below.

[Equation 4]

$$P'_{t,d} \sum_{\omega=\omega_{min}}^{\omega_{max}} \sqrt{q^1_{t,\omega}}\, P_{t,d,\omega} \qquad (4)$$

In Equation (4), $q^1_{t,\omega}$ is a maximum eigenvalue in the frequency bin $\omega$. The sound source localization unit 14 determines, for each direction, that there is a sound source if a sum value $P'_{t,d}$ is equal to or greater than the second threshold value $P_{thres}$, and determines that there is no sound source if the sum $P'_{t,d}$ is smaller than the second threshold value $P_{thres}$.

<Sound Source Separation Process>

Next, an overview of a sound source separation process using a GHDSS-AS method (see, for example, Resource 2) which is performed by the sound source separation unit 18 will be described.

In the following description, the number of sound sources is N ($\geq$ the number M of microphones). Further, a vector of a spectrum for N sound sources at the frequency $\Omega$ is $u(\omega) = [s_1(\omega)\ s_2(\omega)\ \ldots\ s_N(\omega)]^T$, and the vector of the spectrum of the acoustic signal collected by the M microphones 11 at the frequency $\omega$ is $\omega$, $x(\omega) = [x_1(\omega)\ x_2(\omega)\ \ldots\ x_M(\omega)]^T$. $x(\omega)$ is expressed as shown in Equation (5) below.

[Equation 5]

$$x(\omega) = D(\omega) u(\omega) \qquad (5)$$

In Equation (5), $D(\omega)$ is a transfer function matrix between the sound source and the microphone 11, and each element $H_{nm}$ of the transfer function matrix represents a transfer function $a_\phi(\omega)$ from an n-th sound source to an m-th microphone 11. In this case, the sound source separation is expressed by Equation (6) below.

[Equation 6]

$$y(\omega) = W(\omega) x(\omega) \qquad (6)$$

In Equation (6), $W(\omega)$ is a separation matrix.

The sound source separation unit 18 uses, for example, two cost functions including a separation sharpness $J_{SS}$ corresponding to blind separation and a geometric constraint $J_{GC}$ corresponding to a beamformer shown in Equations (7) and (8) to calculate a separation matrix $W(\omega)$.

[Equation 7]

$$J_{SS}(W) = \|\phi(y) y^H - \mathrm{diag}[\phi(y) y^H]\|^2 \qquad (7)$$

[Equation 8]

$$J_{GC}(W) = \|\mathrm{diag}[WD - I]\|^2 \qquad (8)$$

In Equations (7) and (8), $\|\ldots\|^2$ is a Frobenius norm of a matrix . . . . The Frobenius norm is a square sum (scalar value) of respective element values constituting a matrix. Further, $\phi(y)$ is a non-linear function and is defined as shown in Equation (9) below.

[Equation 9]

$$\phi(y) = [\phi(y_1), \phi(y_2), \ldots, \phi(y_N)]^T \qquad (9)$$

In Equation (9), $\phi(y_i)$ is defined as shown in, for example, Equation (10) below.

[Equation 10]

$$\phi(y_i) = \tan h(\eta|y_i|) e^{j\cdot\Theta(y_i)} \qquad (10)$$

In Equation (10), $\eta$ is a scale parameter.

A final cost function $J(W)$ is expressed as shown in Equation (11) below.

[Equation 11]

$$J(W) = \alpha J_{SS}(W) + J_{GC}(W) \qquad (11)$$

In Equation (11), $\alpha$ indicates a weighting parameter between two cost functions.

The sound source separation unit 18 updates the separation matrix $W(\omega)$, for example, for each frame, using Equation (12) below.

[Equation 12]

$$W_{t+1} = W_t - \mu_{SS} J'_{SS}(W_t) - \mu_{GC} J'_{GC}(W_t) \qquad (12)$$

In Equation (12), $W_t$ indicates the separation matrix W at a time t, $J'_{SS}(W)$ and $J'_{GC}(W)$ indicate complex gradients of $J_{SS}(W)$ and $J_{GC}(W)$. Further, $\mu_{SS}$ and $\mu_{GC}$ are step size parameters.

<Reference 2>

"Robot Audition . . . Hands-Free Voice Recognition Under High Noise . . . ", Kazuhiro Nakadai and Hiroshi Okuno, The Institute of Electronics, Information and Communication Engineers, Technical Report, 2011.

<Noise Spectrum Estimation Process>

Next, the noise spectrum estimation process performed by the S/N estimation unit 202 will be described.

The S/N estimation unit 202 calculates an addition average value SPave(d) of the space spectrum MusicSP(k,d) input from the sound source localization unit 14, for each direction d, using a section in which no sound source is detected, that is, a section in which presence of noise is determined, and Equation (13) below.

[Equation 13]

$$SPave(d) = \frac{1}{N} \sum_{k \subset Noise} MusicSP(k, d) \quad (13)$$

In Equation (13), N indicates the number of frames in which the sound source is not detected (noise is detected) in one stream, k indicates a frame in which noise is detected, and d is a direction.

The S/N estimation unit 202 adds a constant $\alpha(d)$ to the calculated addition average value SPave(d), and calculates an identification threshold value $Th_{SSI}(d)$ using Equation (14) below.

[Equation 14]

$$Th_{SSI}(d) = SPave(d) + \alpha(d) \quad (14)$$

In Equation (14), the constant $\alpha(d)$ is set to a value such that presence of a sound source can be clearly determined, such as approximately 1. An initial value of the identification threshold value may be a value determined on the basis of, for example, a result obtained by actual measurement or the like.

The S/N estimation unit 202 determines whether the power of the spatial spectrum is equal to or higher than the calculated identification threshold value $Th_{SSI}(d)$ (first threshold value), for each direction and for each frame of the localized sound source.

If the power of the spatial spectrum is equal to or higher than the calculated identification threshold value $Th_{SSI}(d)$, the S/N estimation unit 202 outputs information indicating that the sound source identification is performed, to the sound source type identification unit 204 for each direction and for each frame of the localized sound source. Further, if the power of the space spectrum is lower than the calculated identification threshold value $Th_{SSI}(d)$, the S/N estimation unit 202 outputs information indicating that the sound source identification is not performed, to the sound source type identification unit 204 for each direction and for each frame of the localized sound source.

An example of the first threshold value (identification threshold value $Th_{SSI}(d)$) and the second threshold value $P_{thres}$ that are used by the S/N estimation unit 202 will be described herein.

The second threshold value is a threshold value for detecting a sound included in the collected acoustic signal. The second threshold value may be a predetermined value or may be a value that is determined according to a magnitude of the collected acoustic signal. A signal with a low SN ratio may be included in a signal of the second threshold value or more.

The first threshold value is an identification threshold value which is calculated using Equation (14), and is a threshold value for extracting a frame of the signal with a high SN ratio.

The first threshold value is greater than the second threshold value. Accordingly, the S/N estimation unit 202 can remove a frame of the signal with a low SN ratio or extract a frame of the signal with a high SN ratio using the first threshold value even when presence of a sound source is detected.

<Processing Procedure Performed by Sound Source Identification Apparatus 1>

Next, a processing procedure performed by the sound source identification apparatus 1 will be described.

Figure 4:
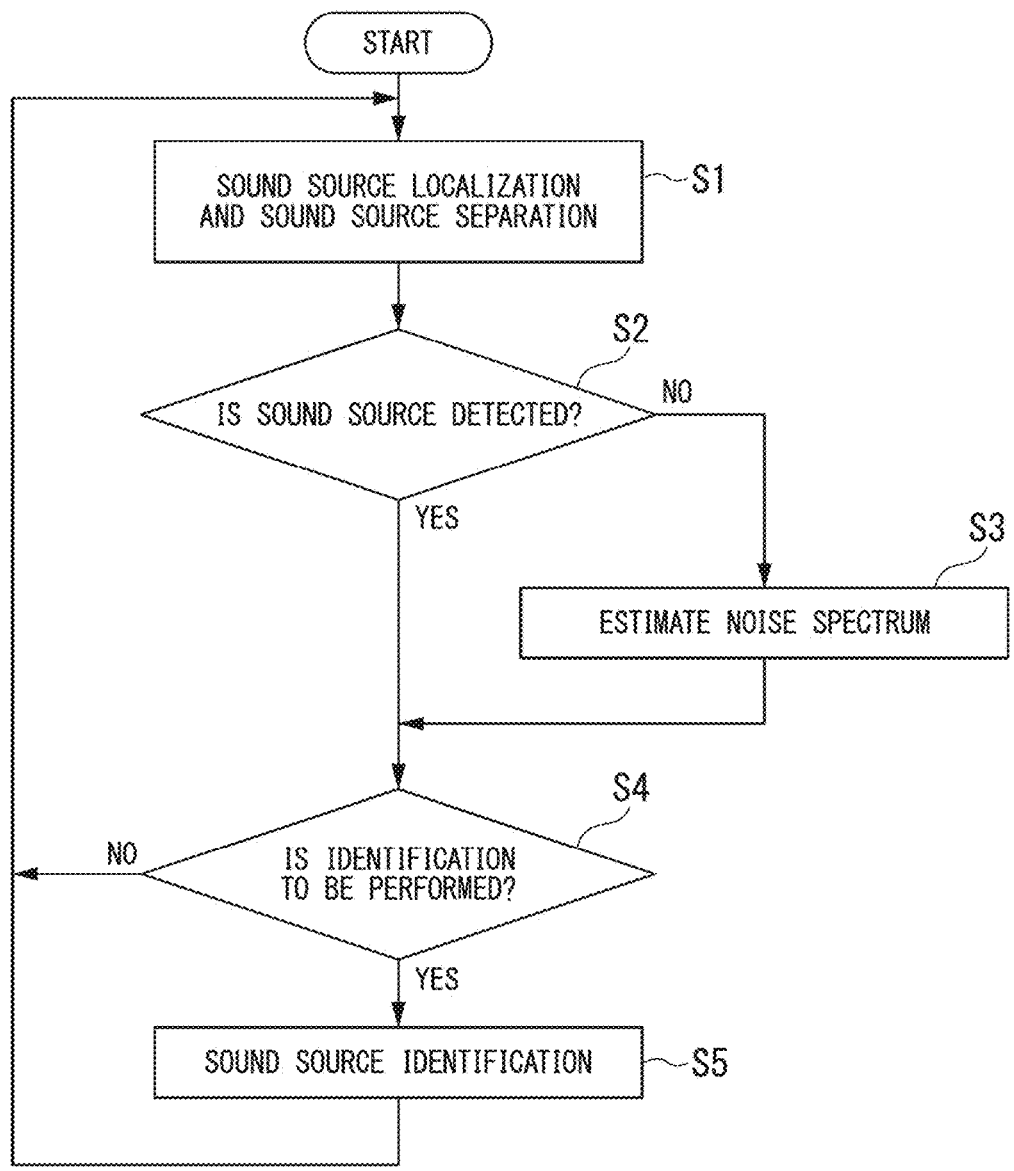
FIG. 4 is a flowchart of a process performed by the sound source identification apparatus according to the first embodiment.

FIG. 4 is a flowchart of a process performed by the sound source identification apparatus 1 according to the embodiment.

(Step S1) The sound source localization unit 14 calculates a spatial spectrum for a frequency domain signal of M channels output by the acoustic signal acquisition unit 12. Subsequently, the sound source localization unit 14 discretely localizes the sound source, for example, in units of one to several tens of frames on the basis of the calculated spatial spectrum. Subsequently, the sound source separation unit 18 continuously separates the acoustic signal for each sound source for the acoustic signal of the M channels in units of frames or samples using the sound source localization information input from the sound source tracking unit 16. The sound source localization process and the sound source separation process may be performed in parallel.

(Step S2) The sound source localization unit 14 determines whether the sound source is detected according to whether or not a sum value of the spatial spectrums at each frequency bin is equal to or greater than the second threshold value, for each localized direction. If the sound source localization unit 14 determines that the sound source is detected (step S2; YES), the process proceeds to step S4. If the sound source localization unit 14 determines that the sound source is not detected (step S2; NO), the sound source localization unit 14 outputs the calculated spatial spectrum to the S/N estimation unit 202 for each localized direction and for each frame in which the sound source is not detected, and proceeds to a process of step S3.

(Step S3) Using Equation (13), the S/N estimation unit 202 calculates an addition average value in one stream of the noise spectrum using the spatial spectrum in which the frame in which the sound source localization is not detected is input, for each localized direction. Subsequently, the S/N estimation unit 202 calculates the first threshold value (identification threshold value) using the calculated addition average value of the noise spectrum and Equation (14). The S/N estimation unit 202 proceeds to a process of step S4.

(Step S4) The S/N estimation unit 202 determines whether or not a magnitude of the power of the spatial spectrum is equal to or greater than the calculated first threshold value (identification threshold value) for each localized direction and for each frame. When the magnitude of the power of the spatial spectrum is equal to or greater than the first threshold value, the S/N estimation unit 202 outputs information indicating that the sound source identification is to be performed, to the sound source type identification unit 204. When the magnitude of the power of the spatial spectrum is smaller than the first threshold value, the S/N estimation unit 202 outputs information indicating that the sound source identification is not to be performed, to the sound source type identification unit 204. Subsequently, the sound source type identification unit 204 determines whether to perform the sound source identification on the basis of the information indicating whether or not to perform the sound source identification, which is output by the S/N estimation unit 202. If the information indicating that the sound source identification is to be performed is input from the S/N estimation unit 202, the sound source type identification unit 204 determines that the identification is to be performed (step S4; YES), and proceeds to a process of step S5. Further, if the information indicating that the sound source identification is not to be performed is input from the S/N estimation unit 202, the sound source type identification unit 204 determines that the identification is not to be performed (step S4; NO), and returns to the process of step S1.

(Step S5) The sound source type identification unit 204 identifies the type of sound source in only a frame in which the S/N estimation unit 202 output the information indicating that the sound source identification is to be performed, for each sound source, using the identifier 22. Subsequently, the sound source type identification unit 204 performs majority within one stream with respect to a result of the identification to identify a type of final sound source, for each sound source. After the sound source identification, the sound source type identification unit 204 returns to the process of step S1.

In this embodiment, the example in which the sound source localization unit 14 determines whether the sound source is detected using the second threshold value has been described, but the present invention is not limited thereto. The S/N estimation unit 202 may determine whether the sound source is detected using the second threshold value with respect to the spatial spectrum output by the sound source localization unit 14.

Further, although the example in which the acoustic signal acquisition unit 12 converts the acquired acoustic signal into the frequency domain signal has been described in this embodiment, the sound source localization unit 14 and the sound source separation unit 18 may convert the acoustic signal into the frequency domain signal.

Further, the sound source separation unit 18 may perform noise suppression using a well-known scheme.

In this embodiment, the example in which the S/N estimation unit 202 calculates the identification threshold value, compares the calculated identification threshold value with the spatial spectrum to generate the information indicating whether or not the identification is to be performed, and outputs the information to the sound source type identification unit 204 has been described, but the present invention is not limited thereto. The S/N estimation unit 202 may output the calculated identification threshold value to the sound source type identification unit 204, and the sound source type identification unit 204 may compare the identification threshold value with the spatial spectrum, for each frame and for each sound source, to determine whether the identification is to be performed, and select only the signal with a high SN ratio according to a result of the determination to perform the identification.

Further, in this embodiment, the example in which the identification threshold value (first threshold value) is dynamically updated, for example, for one stream has been described, but the present invention is not limited thereto. The sound source identification apparatus 1 updates the identification threshold value (the first threshold value) a predetermined number of times which is at least one or more, and then fixes the identification threshold value (the first threshold value). For example, the sound source identification apparatus 1 may stop updating when the updated identification threshold value (first threshold value) is within a predetermined range, and fix the identification threshold value (first threshold value).

As described above, the sound source identification apparatus 1 of this embodiment includes the sound collection unit 10 including the plurality of microphones 11, the sound source localization unit 14 that localizes the sound source on the basis of the acoustic signal collected by the sound collection unit, the sound source separation unit 18 that performs separation of the sound source on the basis of the signal localized by the sound source localization unit, the sound source identification unit 20 (the S/N estimation unit 202 and the sound source type identification unit 204) that performs identification of the type of sound source on the basis of a result of the separation in the sound source separation unit, and a signal input to the sound source identification unit is a great signal having a magnitude equal to or greater than the first threshold value (identification threshold value $Th_{SSI}$) which is a predetermined value.

With this configuration, in this embodiment, it is possible to improve accuracy of the sound source identification since the identification of the sound source is performed using only the signal with a high SN ratio.

Further, in the sound source identification apparatus 1 of this embodiment, the sound source identification unit 20 (the S/N estimation unit 202 and the sound source type identification unit 204) performs the identification of the type of sound source on a signal of which a magnitude of the sound source is equal to or greater than the first threshold value when the sound source is detected using the second threshold value $P_{thres}$ different from the first threshold value (identification threshold value $Th_{SSI}$).

Further, in the sound source identification apparatus 1 of this embodiment, a signal having the first threshold value (identification threshold value $Th_{SSI}$) or more is a signal of the sound source localized by the sound source localization unit 14.

With this configuration, in this embodiment, it is possible to prevent the sound source identification from being performed on noise since the sound source identification is performed only when the sound source is detected, that is, on only the signal with a high SN ratio.

Further, in the sound source identification apparatus 1 of this embodiment, when the sound source is not detected, the sound source identification unit 20 (the S/N estimation unit 202 and the sound source type identification unit 204) performs estimation of the spectrum of noise included in the collected acoustic signal, and determines the first threshold value (identification threshold value $Th_{SSI}$) on the basis of an estimated value of the estimated spectrum of the noise.

With this configuration, in this embodiment, it is possible to appropriately obtain the first threshold value (identification threshold value $Th_{SSI}$) used for sound source identification by estimating the spectrum of the noise.

Further, in the sound source identification apparatus 1 of this embodiment, the sound source identification unit 20 (the S/N estimation unit 202 and the sound source type identification unit 204) calculates the first threshold value (identification threshold value $Th_{SSI}$) using the addition averaging SPave(d) of the estimated value of the noise spectrum.

With this configuration, in this embodiment, it is possible to reduce an influence of sudden noise or the like by using the averaged noise spectrum.

[Second Embodiment]

While the example in which the signal with a high SN ratio is extracted and the sound source identification is performed using the result of the sound source localization in the sound source localization unit 14 has been described in the first embodiment, in the second embodiment, an example in which the signal with a high SN ratio is extracted and the sound source identification is performed using a result of sound source separation in the sound source separation unit will be described.

<Configuration of Sound Source Identification Apparatus 1A>

Figure 5:
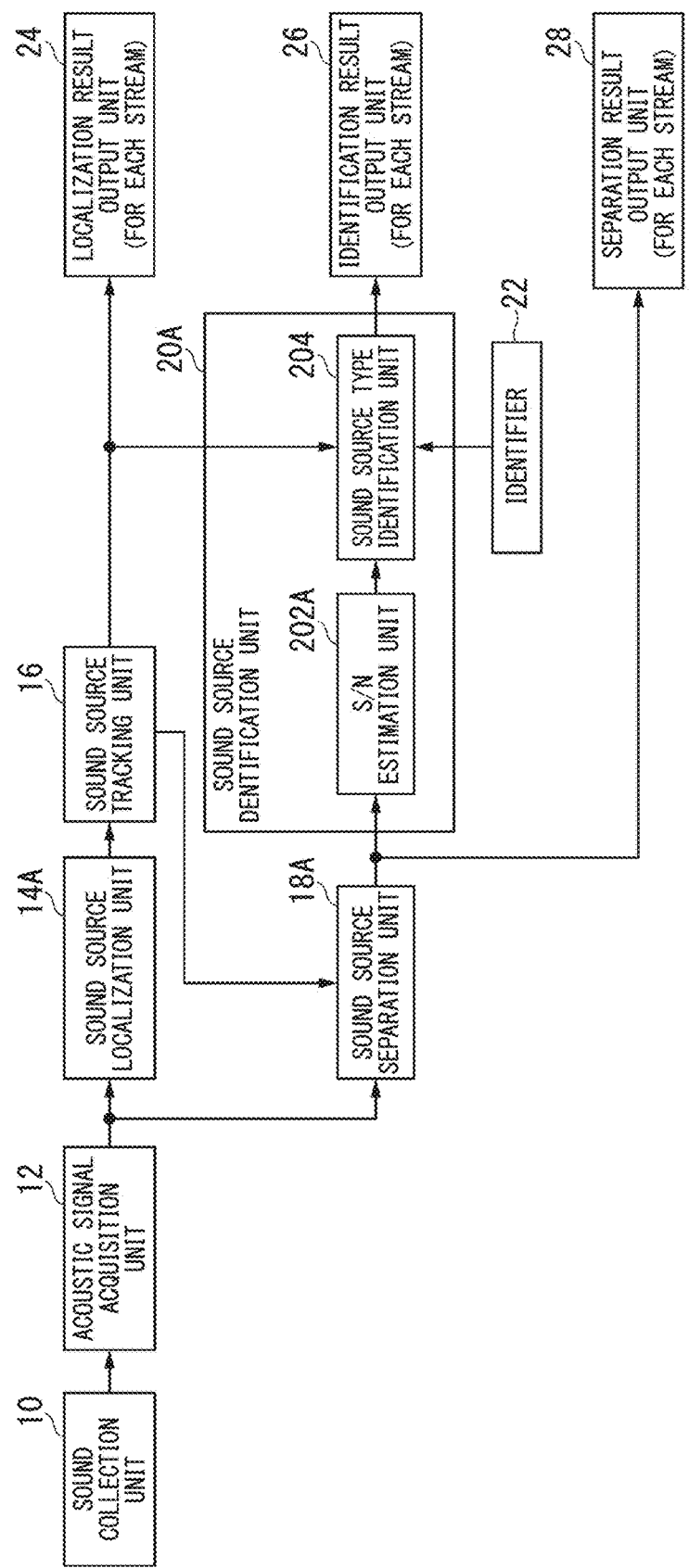
FIG. 5 is a block diagram illustrating a configuration of a sound source identification apparatus according to a second embodiment.

FIG. 5 is a block diagram illustrating a configuration of a sound source identification apparatus 1A according to this embodiment.

As illustrated in FIG. 5, the sound source identification apparatus 1A includes a sound collection unit 10, an acoustic signal acquisition unit 12, a sound source localization unit 14A, a sound source tracking unit 16, a sound source separation unit 18A, a sound source identification unit 20A, an identifier 22, a localization result output unit 24, an identification result output unit 26, and a separation result output unit 28. Further, the sound source identification unit 20A includes an SN estimation unit 202A and a sound source type identification unit 204. Functional units having the same functions as those in the sound source identification apparatus 1 are denoted with the same reference signs, and description thereof will be omitted.

The sound source localization unit 14A calculates a spatial spectrum for the frequency domain signal of M channels output by the acoustic signal acquisition unit 12. The sound source localization unit 14A performs sound source localization discretely in units of the calculated spatial spectrum, for example, one to several tens of frames. The sound source localization unit 14A outputs estimated direction angle information of the sound source to the sound source tracking unit 16.

The sound source separation unit 18A separates the acoustic signal of each sound source continuously in units of frames or samples using, for example, a GHDSS-AS method with respect to the frequency domain signal of M channels output by the acoustic signal acquisition unit 12 using the sound source localization information input from the sound source tracking unit 16. The sound source separation unit 18A outputs the separated frequency domain signal (the spectrum) for each sound source to the S/N estimation unit 202A of the sound source identification unit 20A and the separation result output unit 28.

The S/N estimation unit 202A extracts a section in which there is an audio signal for each separated frequency domain signal using a well-known scheme. For example, the S/N estimation unit 202A determines a section in which there is a sound source if the power of the spectrum for each sound source is equal to or higher than the second threshold value, and determines a section in which there is no sound source if the power of the spectrum is lower than the second threshold value. The detection of the section in which there is an audio signal may be performed by the sound source separation unit 18A. The S/N estimation unit 202A calculates, for each sound source, an addition average value SPave of a spectrum SP(k,ω) in a predetermined band among frequency signal spectra output by the sound source separation unit 18A in the section in which there is no sound source. Here, the predetermined band is, for example, a band (for example, 500 Hz to 2800 Hz) in which voice and noise are easily distinguished. The predetermined band may be a band according to another acoustic signal to be extracted. The following description is given on the assumption that the sound source identification target is voice. The S/N estimation unit 202A performs extraction of the predetermined band by setting ω=500 Hz to 2800 Hz in Equation (15) below.

[Equation 15]

$$SPave = \frac{1}{N} \sum_{k \subset Noise} \left( \frac{1}{F} \sum_{\omega \subset Speech} |SP(k, \omega)| \right) \quad (15)$$

In Equation (15), F is a sampling number of a frequency. For example, when a band of frequencies is 500 Hz to 2800 Hz and the processing is performed at every 10 Hz, 230 {(2800−500)/10}.

The S/N estimation unit 202A adds the constant α to the calculated addition average value SPave and calculates the identification threshold value $Th_{SSI}$ using Equation (16) below, for each sound source.

[Equation 16]

$$Th_{SSI} = SPave + \alpha \quad (16)$$

In Equation (16), the constant α is set to a value such that presence of a sound source can be clearly determined, such as approximately 10 dB. An initial value of the identification threshold value may be, for example, a value determined on the basis of a result obtained through actual measurement or the like. The S/N estimation unit 202A compares the calculated identification threshold value with the spectrum, for each separated sound source and for each frame. The S/N estimation unit 202A determines whether to perform the sound source identification based on a result of the comparison, and outputs information indicating whether or not to perform the sound source identification after the determination to the sound source type identification unit 204.

<Processing Procedure Performed by Sound Source Identification Apparatus 1A>

Next, a processing procedure performed by the sound source identification apparatus 1A will be described.

Figure 6:
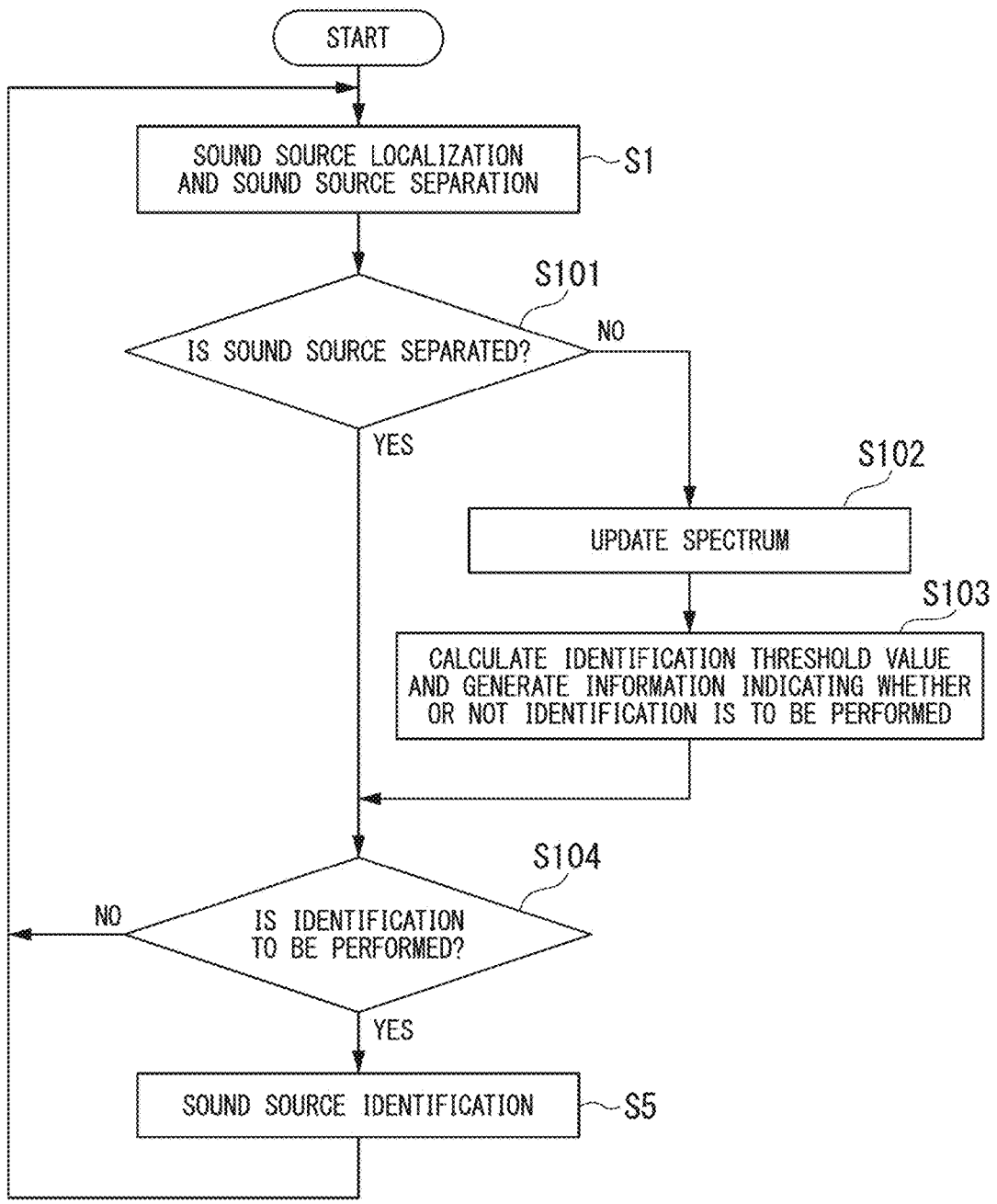
FIG. 6 is a flowchart of a process performed by the sound source identification apparatus according to the second embodiment.

FIG. 6 is a flowchart of a process performed by the sound source identification apparatus 1A according to this embodiment. The same processes as the processes performed by the sound source identification apparatus 1 are denoted with the same reference signs and description thereof will be omitted.

(Step S101) The sound source separation unit 18A determines whether or not the sound source was separated from the collected acoustic signal. If the sound source separation unit 18A determines that the sound source was separated from the collected acoustic signal (step S101; YES), the process proceeds to step S104. If the sound source separation unit 18A determines that the sound source was not separated from the collected acoustic signal (step S101; NO), the process proceeds to step S102.

(Step S102) The S/N estimation unit 202A, for example, determines a section in which there is a sound source if the power of the spectrum for each sound source is equal to or higher than the second threshold value, and determines a section in which there is no sound source if the power of the spectrum is lower than the second threshold value. Subsequently, the S/N estimation unit 202A calculates and updates an addition average value SPave of a spectrum SP(k,ω) in a predetermined band among frequency signal spectra output by the sound source separation unit 18A in the section in which there is no sound source using Equation (15) for each sound source.

The S/N estimation unit 202A proceeds to a process of step S103.

(Step S103) The S/N estimation unit 202A calculates the first threshold value (the identification threshold value) for each sound source using the calculated addition average value of the noise spectrum and Equation (16). Subsequently, the S/N estimation unit 202A compares the calculated identification threshold value with the spectrum for each separated sound source and for each frame. Subsequently, the S/N estimation unit 202A determines whether to perform the sound source identification based on a result of the comparison, and outputs information indicating whether or not to perform the sound source identification after the determination to the sound source type identification unit 204. The S/N estimation unit 202A proceeds to a process of step S104.

(Step S104) The sound source type identification unit 204 determines whether to perform the sound source identification on the basis of the information indicating whether or not to perform the sound source identification, which is output by the S/N estimation unit 202A. If the information indicating that the sound source identification is to be performed is input from the S/N estimation unit 202A, the sound source type identification unit 204 determines that the identification is to be performed (step S104; YES), and proceeds to a process of step S5.

Further, if the information indicating that the sound source identification is not to be performed is input from the S/N estimation unit 202A, the sound source type identification unit 204 determines that the identification is not to be performed (step S104; NO), and returns to the process of step S1.

In this embodiment, the identification threshold value (the first threshold value) may be updated a predetermined number of times which is at least one or more, and then the identification threshold value (the first threshold value) may be fixed.

As described above, in the sound source identification apparatus 1A of this embodiment, a signal having the first threshold value (identification threshold value $Th_{SSI}$) or more is a signal of the sound source separated by the sound source separation unit 18A.

In this configuration, in this embodiment, since the identification of the type of sound source is performed using the signal with a high SN ratio among the acoustic signals separated by the sound source separation unit 18A, it is possible to improve accuracy of the sound source identification.

[Third Embodiment]

While the example in which the sound source separation unit 18A or the S/N estimation unit 202A compares the power of the spectrum with the second threshold value to detect the section in which there is an audio signal has been described in the second embodiment, in the third embodiment, an example in which the section in which there is an audio signal is detected with respect to an audio signal in a time domain and the sound source identification is performed will be described.

<Configuration of Sound Source Identification Apparatus 1B>

Figure 7:
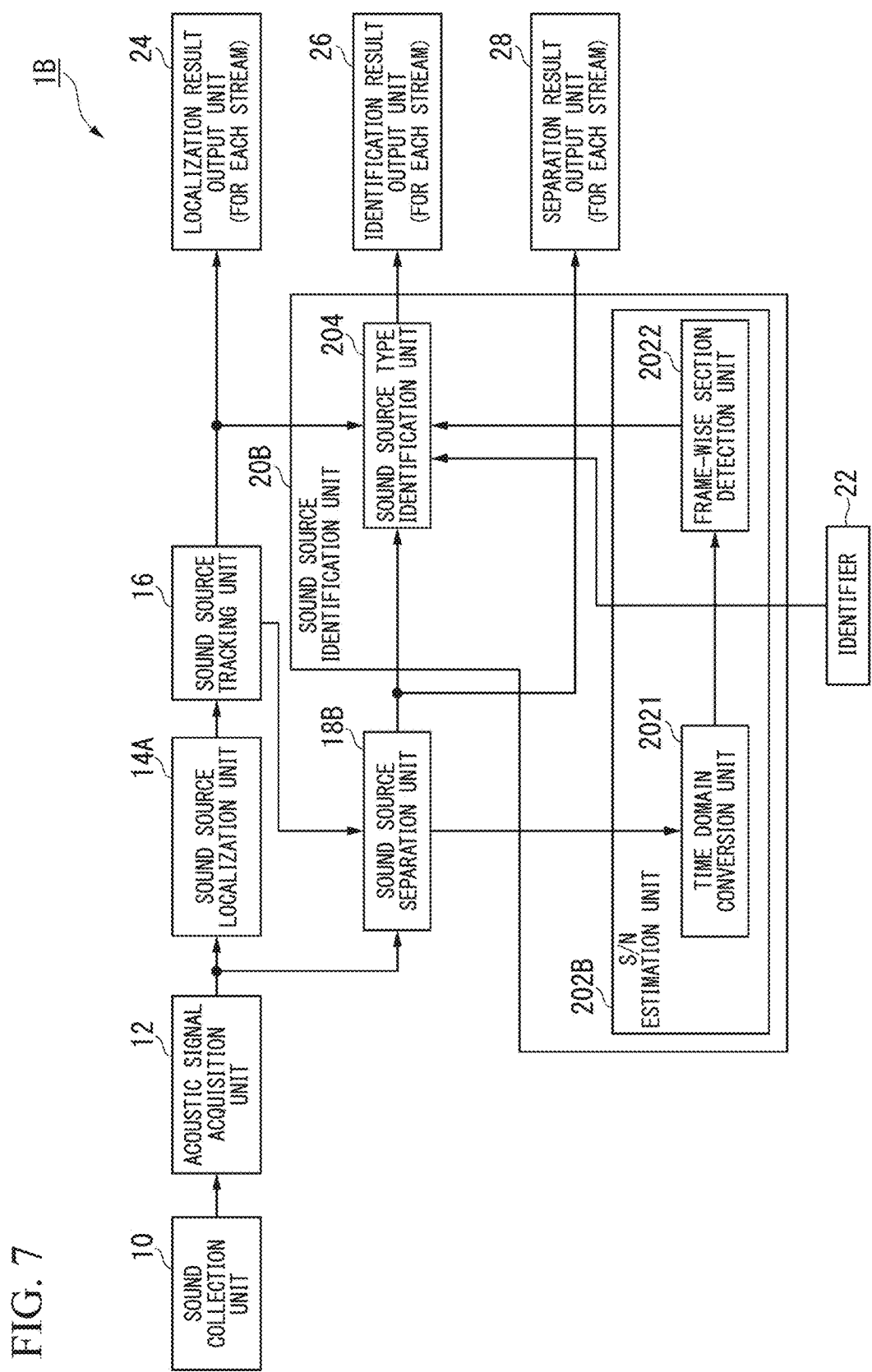
FIG. 7 is a block diagram illustrating a configuration of a sound source identification apparatus according to a modification example of a third embodiment.

FIG. 7 is a block diagram illustrating a configuration of a sound source identification apparatus 1B according to a modification example of the embodiment.

As illustrated in FIG. 7, the sound source identification apparatus 1B includes a sound collection unit 10, an acoustic signal acquisition unit 12, a sound source localization unit 14A, a sound source tracking unit 16, a sound source separation unit 18B, a sound source identification unit 20B, an identifier 22, a localization result output unit 24, an identification result output unit 26, and a separation result output unit 28. Further, the sound source identification unit 20B includes an S/N estimation unit 202B and a sound source type identification unit 204. Further, the S/N estimation unit 202B includes a time domain conversion unit 2021 and a frame-wise section detection unit 2022. Functional units having the same functions as those in the sound source identification apparatus 1A are denoted with the same reference signs, and description thereof will be omitted. Further, an example in which the sound source identification target is voice will be described in this embodiment, but the identification target is not limited to voice.

The sound source separation unit 18B separates the acoustic signal of each sound source continuously in units of frames or samples using, for example, a GHDSS-AS method with respect to the frequency domain signal of M channels output by the acoustic signal acquisition unit 12 using the sound source localization information input from the sound source tracking unit 16. The sound source separation unit 18B outputs the separated frequency domain signal (the spectrum) for each sound source to the S/N estimation unit 202B and the sound source type identification unit 204 of the sound source identification unit 20B, and the separation result output unit 28.

The time domain conversion unit 2021 converts the separated frequency domain signal for each sound source output by the sound source separation unit 18B into a time domain signal, and outputs the converted time domain signal to the frame-wise section detection unit 2022 for each sound source.

The frame-wise section detection unit 2022 extracts the section in which there is an audio signal with respect to the separated frequency domain signal for each sound source using a well-known scheme (for example, a scheme of extracting a speech section described in Japanese Unexamined Patent Publication No. 2014-145838). In extracting the section in which there is an audio signal, the frame-wise section detection unit 2022 compares power of the signal with the first threshold value and detects a zero cross point of the signal to extract the section in which there is an audio signal. The frame-wise section detection unit 2022 outputs information indicating that the identification is performed on the detected section in which there is an audio signal, to the sound source type identification unit 204. Further, the frame-wise section detection unit 2022 outputs information indicating that the identification is not performed on a detected section in which there is no audio signal, to the sound source type identification unit 204.

<Processing Procedure Performed by Sound Source Identification Apparatus 1B>

Next, a processing procedure performed by the sound source identification apparatus 1B will be described.

Figure 8:
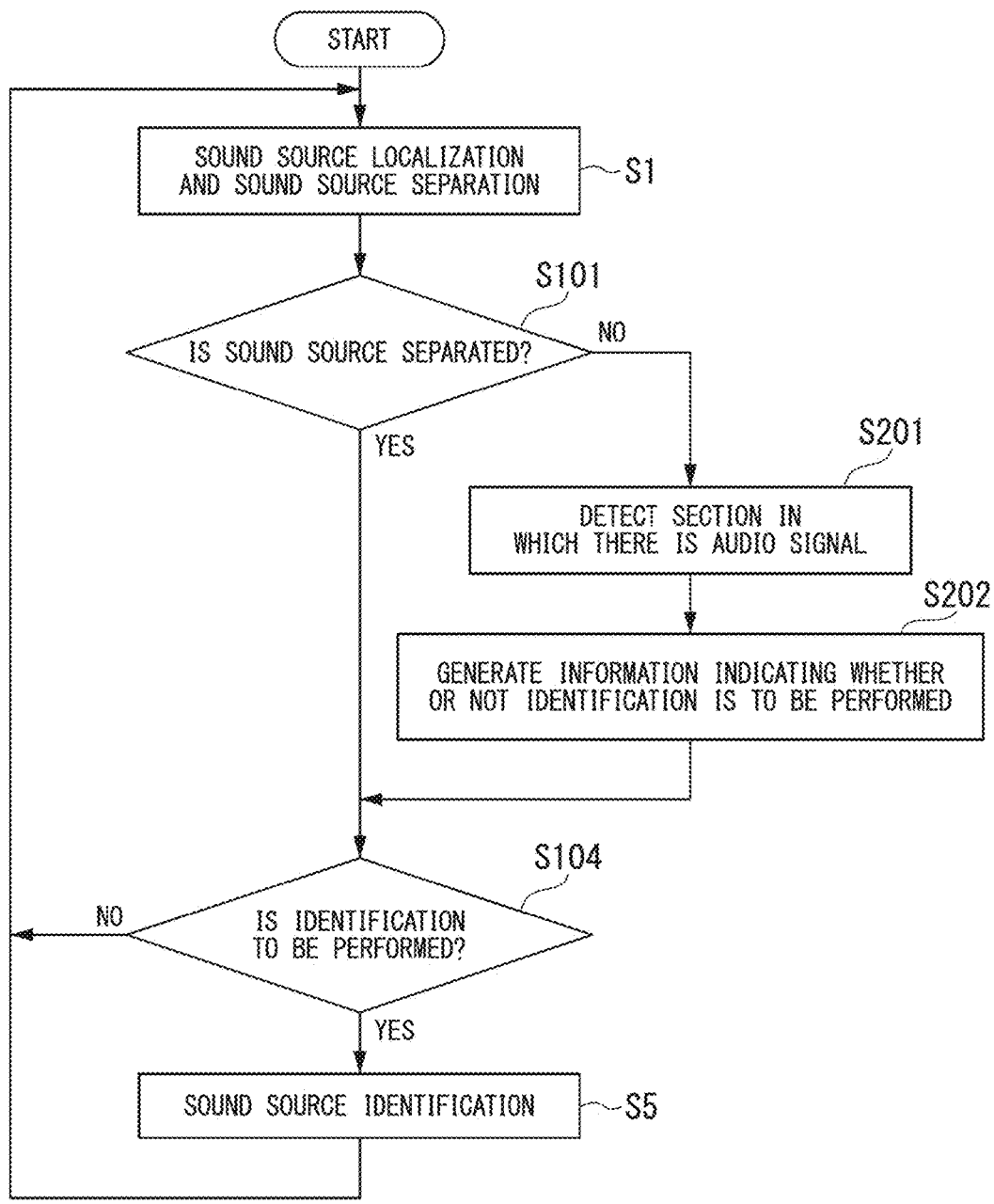
FIG. 8 is a flowchart of a process performed by a sound source identification apparatus according to the third embodiment.

FIG. 8 is a flowchart of a process performed by the sound source identification apparatus 1B according to the embodiment. The same processes as the processes performed by the sound source identification apparatus 1 or the sound source identification apparatus 1B are denoted with the same reference signs and description thereof will be omitted.

(Step S101) The sound source separation unit 18B determines whether or not the sound source was separated from the collected acoustic signal. If the sound source separation unit 18B determines that the sound source was separated from the collected acoustic signal (step S101; YES), the process proceeds to step S104. If the sound source separation unit 18B determines that the sound source was not separated from the collected acoustic signal (step S101; NO), the process proceeds to step S201.

(Step S201) The time domain conversion unit 2021 converts the separated frequency domain signal for each sound source output by the sound source separation unit 18B into a time domain signal. Subsequently, the frame-wise section detection unit 2022 extracts the section in which there is an audio signal with respect to the separated frequency domain signal for each sound source using a well-known scheme (for example, a scheme of extracting a speech section described in Japanese Unexamined Patent Publication No. 2014-145838). The frame-wise section detection unit 2022 proceeds to the process of step S202.

(Step S202) The frame-wise section detection unit 2022 outputs information indicating that the identification is performed on the detected section in which there is an audio signal, to the sound source type identification unit 204. Further, the frame-wise section detection unit 2022 outputs information indicating that the identification is not performed on a detected section in which there is no audio signal, to the sound source type identification unit 204. The frame-wise section detection unit 2022 proceeds to the process of step S104.

(Step S104) The sound source type identification unit 204 determines whether to perform the sound source identification on the basis of the information indicating whether or not to perform the sound source identification, which is output by the frame-wise section detection unit 2022.

If the information indicating that the sound source identification is to be performed is input from the frame-wise section detection unit 2022, the sound source type identification unit 204 determines that the identification is to be performed (step S104; YES), and proceeds to a process of step S5. Further, if the information indicating that the sound source identification is not to be performed is input from the frame-wise section detection unit 2022, the sound source type identification unit 204 determines that the identification is not to be performed (step S104; NO), and returns to the process of step S1.

In the above-described example, the example in which the section in which there is an audio signal is detected using a scheme of extracting a speech section described in Japanese Unexamined Patent Publication No. 2014-145838 has been described, but the present invention is not limited thereto. The detection of the section in which there is an audio signal may be performed using other well-known schemes.

As described above, according to the third embodiment, it is possible to perform the sound source identification using the result of the source separation, as in the second embodiment. As a result, in the third embodiment, it is possible to obtain the same effects as those in the second embodiment. Further, according to the third embodiment, an effect that the well-known scheme of detecting a speech section can be used is also obtained.

[Fourth Embodiment]

The example in which the signal with a high SN ratio in the spatial spectrum subjected to the sound source localization is extracted using the first threshold value or the signal with a high SN ratio in the separated spectrum is extracted using the first threshold value, and the identification of the type of sound source is performed using the identifier 22 has been described in the first to third embodiments.

An example in which the first threshold value fixed by causing the first threshold value to be learned together when causing the identifier to be learned is used will be described in this embodiment. Although an example in which the present invention is applied to the sound source identification apparatus 1 will be described hereinafter, the present invention may be applied to the sound source identification apparatus 1A or the sound source identification apparatus 1B.

Figures 9, 10:
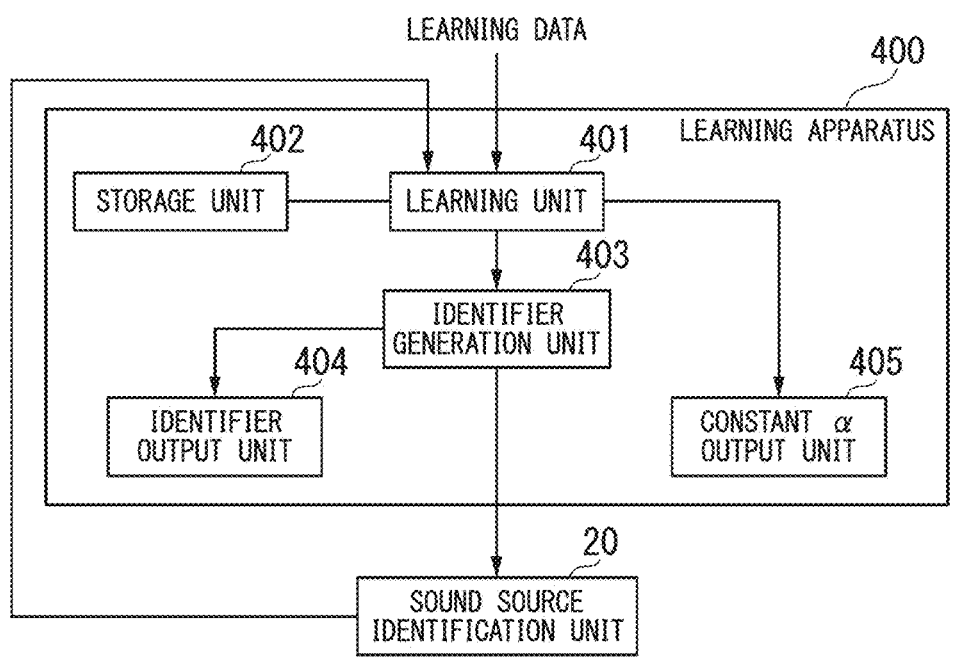
FIG. 9 is a block diagram illustrating an example of a configuration of a learning apparatus for causing an identifier and a constant α to be learned according to a fourth embodiment.
FIG. 10 is a diagram illustrating an example of values learned by the identifier according to the fourth embodiment.

FIG. 9 is a block diagram illustrating an example of a configuration of a learning apparatus 400 that causes the identifier 22 and the constant $\alpha$ to be learned according to this embodiment.

As illustrated in FIG. 9, the learning apparatus 400 includes a learning unit 401, a storage unit 402, an identifier generation unit 403, an identifier output unit 404, and a constant $\alpha$ output unit 405.

The spatial spectrum of each sound source localized by the sound source identification apparatus 1 is input as learning data to the learning unit 401. The learning unit 401 calculates an addition average value SPave(d) of the spatial spectrum MusicSP(k,d), and calculates the identification threshold value by changing the value of the constant $\alpha$. The learning unit 401 performs the sound source identification using the sound source identification unit 20 of the sound source identification apparatus 1. A recognition rate of an identification result, the sound used for identification, the addition average value SPave(d) of the spatial spectrum MusicSP(k,d), the constant $\alpha$, and the identification threshold value are stored in the storage unit 402 in association with one another, as illustrated in FIG. 10, for learning. FIG. 10 is a diagram illustrating an example of values learned by the identifier according to this embodiment. The learning unit 401 changes the constant $\alpha$ and selects the constant $\alpha$ at which the recognition rate is highest. The learning unit 401 outputs the optimized constant $\alpha$ to the constant $\alpha$ output unit 405.

The identifier generation unit 403 generates an identifier using a signal (for example, the acoustic signals, the spatial spectrum, or an acoustic feature amount) based on the acoustic signal extracted with the constant $\alpha$ in which the recognition rate is highest, and outputs the generated identifier to the identifier output unit 404.

The identifier output unit 404 stores the identifier output by the identifier generation unit 403 in the identifier 22 of the sound source identification apparatus 1. The constant $\alpha$ may be stored in the identifier 22.

The constant $\alpha$ output unit 405 writes the constant $\alpha$ output by the learning unit 401 to the SN estimation unit 202 of the sound source identification unit 20.

Figures 11, 12, 13:
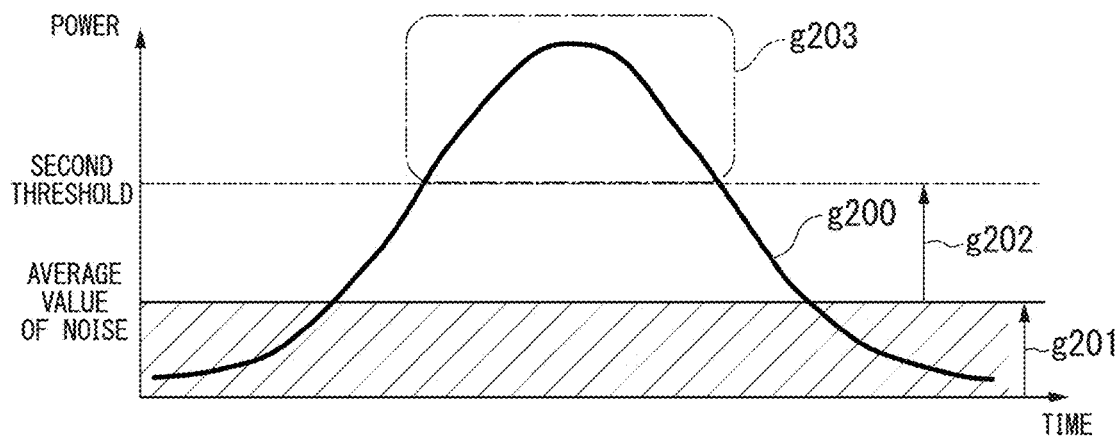
FIG. 11 is a diagram illustrating an example of learned values according to the fourth embodiment.
FIG. 12 is a diagram illustrating sound sources used in a confirmation experiment of sound source identification.
FIG. 13 is a diagram illustrating parameters of sound source localization used in the confirmation experiment of sound source identification.

FIG. 11 is a diagram illustrating an example of values learned according to this embodiment.

A signal in FIG. 11 is an acoustic signal g200 expressed in a time domain. A horizontal axis indicates time, and a vertical axis indicates power. Further, a reference sign g201 indicates the addition average value SPave(d) of the spatial spectrum MusicSP(k,d), a reference sign g202 is a constant $\alpha$, and a reference sign g203 indicates a portion that is extracted as a signal with a high SN ratio.

Thus, according to this embodiment, when learning of the identifier 22 is performed, the constant $\alpha$ is also learned together. Accordingly, a signal with a high SN ratio can be extracted using an optimum constant $\alpha$ with high accuracy. The number of constants $\alpha$ is not limited to one. For example, the constant $\alpha$ may be provided for each type of sound source, or a plurality of constants $\alpha$ may be provided for one sound source. For example, the constant $\alpha$ may be a value associated with each addition average value SPave(d) of the spatial spectrum MusicSP(k,d) which is an average value of the noise spectrum. In this case, the sound source identification unit 20 may select one of a plurality of constants $\alpha$ according to the average value of the noise spectrum and perform the sound source identification.

[Result of Confirmation Experiment]

Next, an example of a result of the confirmation experiment of the sound source identification will be described based on the sound source identification apparatus 1 of the first embodiment.

In the sound source identification apparatus used in the experiment, the identifier 22 learned using a convolutional neural network (CNN) was used. The used CNN was convolutional layer 1, pooling layer 1, intermediate layer 1, and output layer 1. As input data to the CNN, respective acoustic features were extracted from separated sounds obtained through a combination of conditions of the section detection of a high SN ratio and the source separation, and an input vector of 20×20 was created and used for learning. Further, the learning was performed using learning parameters such as the number of times of learning of 1000 times and a learning coefficient of 0.10, and SGD mini-batch learning was performed in a batch size of 50.

In the sound source identification, since CNN was used, a convolution process was performed on a two-dimensional image of the spatial spectrum.

Further, in the experiment, the sound collection unit 10 included sixteen microphones 11, as illustrated in FIG. 2. The sound source identification apparatus 1 was attached to a quadcopter, the acoustic signal collected by the sound collection unit 10 was recorded at a sampling frequency of 16 kHz and with a resolution of 24 bits, and the confirmation of the sound source identification was performed using the recorded acoustic signal.

Further, the sound source localization unit 14 performed the sound source localization using an iGSVD-MUSIC-CMS method (see, for example, Reference 3) that is an extension of the MUSIC method, and the sound source separation unit 18 performed the sound source separation using the GHDSS-AS method.

Further, in the experiment, a section of the signal with a high SN ratio was extracted from the collected acoustic signal using the method described in the first embodiment, and the sound source identification was performed using only the extracted signal with a high SN ratio.

<Reference 3>

Improvement of Outdoor Environment Sound Source Search By iGSVD-MUSIC Method Using Correlation Matrix Scaling, Ohata, et al., The 32nd Annual Conference of The Robotics Society of Japan, 2014.

FIG. 12 is a diagram illustrating sound sources used in a confirmation experiment for the sound source identification. As illustrated in FIG. 12, two types of voice (the voice of a woman providing guidance and the voice of a man shouting), eight types of non-voice (sounds of an ambulance, applause, an alarm clock, cymbals, a horn, a crow cawing, a cell phone (mobile phone), and a whistle) were used. A length of each sound source was 3 to 4 seconds, and each sound event was repeatedly collected 15 times. Further, the sound collection was performed in a state in which a quadcopter hovered and a distance between the sound source and the quadcopter was 3 m. Further, a sound source in which each acoustic signal was output from a speaker was used as the sound source.

FIG. 13 is a diagram illustrating parameters for sound source localization used in the confirmation experiment for sound source identification. As illustrated in FIG. 13, the number (NUM_SOURSE) of sound sources was set to 1, a threshold value (THRESH; second threshold value) of power for separating noise and a sound source when section detection was performed was set to 23.04, and a time width (PAUSE_LENGTH) at which a detected sound source was regarded as the same sound source was set to 500 ms.

Figures 14, 15:
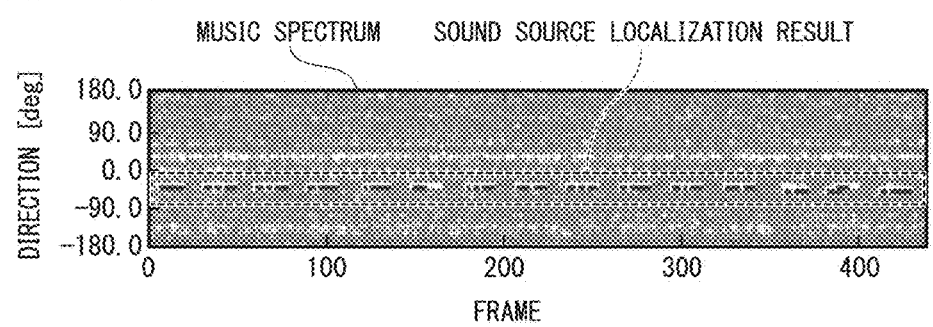
FIG. 14 is a diagram illustrating an example of a MUSIC spectrum and a sound source localization result when a whistle sound was used as a sound source.
FIG. 15 is a diagram illustrating evaluation results of section detection and source separation in the confirmation experiment of sound source identification.

FIG. 14 is a diagram illustrating an example of a MUSIC spectrum and a sound source localization result when a whistle sound was used as the sound source. In FIG. 14, a horizontal axis indicates frames, and a vertical axis indicates a direction.

FIG. 15 is a diagram illustrating an evaluation result for the sound source separation in the confirmation experiment of sound source identification.

The result illustrated in FIG. 15 is a recognition rate in the sound source identification when CNN, GMM (mixture number 10), and GMM (mixture number 20) were used for learning of the identifier 22 (FIG. 1).

As illustrated in FIG. 15, the recognition rate was highest at 98.02% when CNN was used, 81.02% when GMM (mixture number 20) was used, and 78.43% when GMM (mixture number 10) was used.

As described above, it was possible to obtain a high recognition rate of 98% or more by using the CNN for the identifier 22 and performing the sound source identification using only the signal with a high SN ratio.

In the embodiment, the example in which the sound source identification apparatus 1 (or 1A or 1B) is attached to the quadcopter has been described, but the present invention is not limited thereto. The sound source identification apparatus 1 (or 1A or 1B) may be attached to a robot, a vehicle, or a mobile device such as a smart phone or a tablet terminal.

The sound source identification can be performed by recording a program for realizing functions of the sound source identification apparatus 1 (or 1A or 1B) in the present invention on a computer-readable recording medium, loading the program recorded on the recording medium to a computer and executing the program. Further, the "computer system" stated herein includes an OS or hardware such as a peripheral device. Further, the "computer system" is assumed to include a WWW system including a homepage providing environment (or display environment). Further, the "computer-readable recording medium" refers to a flexible disk, a magneto-optical disc, a ROM, a portable medium such as a CD-ROM, or a storage device such as a hard disk built in a computer system. Further, the "computer-readable recording medium" is also assumed to include a recording medium that holds a program for a certain time, such as a volatile memory (a RAM) inside a computer system including a server and a client when a program is transmitted over a network such as the Internet or a communication line such as a telephone line.

Further, the program may be transmitted from a computer system in which the program is stored in a storage device or the like to other computers via a transfer medium or by transfer waves in the transfer medium. Here, the "transfer medium" for transferring the program refers to a medium having a function of transferring information, such as a network (communication network) such as the Internet or a communication line such as a telephone line. Further, the program may be a program for realizing some of the above-described functions. Alternatively, the program may be a program capable of realizing the above-described functions in combination with a program previously stored in the computer system, that is, a so-called differential file (differential program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A sound source identification apparatus, comprising:
a sound collection unit including a plurality of microphones;
wherein the sound source identification apparatus: localizes a sound source on the basis of an acoustic signal collected by the sound collection unit;
separates the sound source on the basis of the acoustic signal collected by the sound collection unit; and
identifies a type of sound source on the basis of a result of the localization and a result of the separation,
wherein the sound source identification performs the identification of the type of the sound source of a signal having a magnitude equal to or greater than a first threshold value which is a predetermined value and does not perform the identification of the type of the sound source of a signal having a magnitude less than the first threshold value, and
wherein an identified type of sound source is a localized sound source having a magnitude equal to or greater than a second threshold value which is less than the first threshold value.

2. The sound source identification apparatus according to claim 1, wherein the type of sound source is identified by estimation of a spectrum of noise included in the collected acoustic signal when the sound source is not detected and determination of the first threshold value on the basis of an estimated value of the estimated spectrum of the noise.

3. The sound source identification apparatus according to claim 2, wherein the type of sound source is identified by calculating the first threshold value using addition average of the estimated value of the spectrum of the noise.

4. A sound source identification apparatus comprising:
a sound collection unit including a plurality of microphones;
wherein the sound source identification apparatus:
localizes a sound source on the basis of an acoustic signal collected by the sound collection unit;
separates the sound source on the basis of the acoustic signal collected by the sound collection unit; and
identifies a type of sound source on the basis of a result of the localization and a result of the separation,
wherein the sound source identification performs the identification of the type of the sound source of a signal having a magnitude equal to or greater than a first threshold value which is a predetermined value and does not perform the identification of the type of the sound source of a signal having a magnitude less than the first threshold value,
wherein an identified type of sound source is a separated sound source having a magnitude equal to or greater than a second threshold value which is less than the first threshold value.

5. A sound source identification method, comprising:
a sound collection process in which a sound collection unit includes a plurality of microphones;
a sound source localization process in which a sound source localization unit localizes a sound source on the basis of an acoustic signal collected in the sound collection process;
a sound source separation process in which a sound source separation unit performs separation of the sound source on the basis of the acoustic signal collected in the sound collection process; and
a sound source identification process in which a sound source identification unit performs identification of a type of sound source of a signal on the basis of a signal having a magnitude equal to or greater than a first threshold value which is a predetermined value among signals separated through the sound source separation process on the basis of a result of the localization in the sound source localization unit and a result of the separation in the sound source separation unit, and
wherein the sound source identification unit does not perform the identification of the type of the sound source of a signal having a magnitude less than the first threshold value, and
wherein a signal input to the sound source identification unit is a signal localized by the sound source localization unit and having a magnitude equal to or greater than a second threshold value which is less than the first threshold value.

6. A sound source identification method, comprising:
a sound collection process in which a sound collection unit includes a plurality of microphones;
a sound source localization process in which a sound source localization unit localizes a sound source on the basis of an acoustic signal collected in the sound collection process;
a sound source separation process in which a sound source separation unit performs separation of the sound source on the basis of the acoustic signal collected in the sound collection process; and
a sound source identification process in which a sound source identification unit performs identification of a type of sound source of a signal on the basis of a signal having a magnitude equal to or greater than a first threshold value which is a predetermined value among signals separated through the sound source separation process on the basis of a result of the localization in the sound source localization unit and a result of the separation in the sound source separation unit, and
wherein the sound source identification unit does not perform the identification of the type of the sound source of a signal having a magnitude less than the first threshold value, and
wherein a signal input to the sound source identification unit is a signal separated by the sound source separation unit and having a magnitude equal to or greater than a second threshold value which is less than the first threshold value.

* * * * *